United States Patent
Anand et al.

[19]

[11] Patent Number: 6,101,983
[45] Date of Patent: Aug. 15, 2000

[54] MODIFIED GAS TURBINE SYSTEM WITH ADVANCED PRESSURIZED FLUIDIZED BED COMBUSTOR CYCLE

[75] Inventors: Ashok Kumar Anand, Niskayuna; Ralph R. Boericke, Glenville, both of N.Y.

[73] Assignee: General Electric Co., Schenectady, N.Y.

[21] Appl. No.: 09/371,169

[22] Filed: Aug. 11, 1999

[51] Int. Cl.[7] .................................................. F02C 6/04
[52] U.S. Cl. ..................... 122/4 D; 60/39.12; 60/39.182; 60/39.464
[58] Field of Search .................. 122/4 D, 7 R; 60/39.12, 39.182, 39.464

[56] References Cited

U.S. PATENT DOCUMENTS

| | | | |
|---|---|---|---|
| 4,164,846 | 8/1979 | Moskowitz et al. | 60/39.464 |
| 4,406,128 | 9/1983 | Fanaritis et al. | 122/4 D |
| 5,010,726 | 4/1991 | Garland | 60/39.464 |
| 5,161,367 | 11/1992 | Scalzo | 60/39.12 |
| 5,251,434 | 10/1993 | Sugita et al. | 60/39.182 |
| 5,440,871 | 8/1995 | Dietz et al. | 122/4 D |
| 5,497,613 | 3/1996 | McGuigan | 60/39.37 |
| 5,918,466 | 7/1999 | Cloyd et al. | 60/39.182 |

Primary Examiner—Denise L. Ferensic
Assistant Examiner—Gregory A. Wilson
Attorney, Agent, or Firm—Nixon & Vanderhye

[57] ABSTRACT

A modified gas turbine system is provided that adapts an advanced pressurized fluidized bed combustor cycle for use with existing combustion turbine technology. To accommodate current combustion turbine technology, the air extracted from the compressor discharge is limited, e.g. to about 20% of the total. The additional air required for the APFBC cycle is provided by an auxiliary source of compressed air. The compressor discharge air that is not extracted is used for combustion of the fuel gas produced by the carbonizer and also provides internal cooling as required by conventional combustion turbine design. A separate expander turbine is used to recover energy from the vitiated air from the PFBC. Energy from the vitiated air may further be recovered by directing the expander exhaust to an HRSG.

21 Claims, 2 Drawing Sheets

MODIFIED GAS TURBINE SYSTEM WITH ADVANCED PRESSURIZED FLUIDIZED BED COMBUSTOR CYCLE

BACKGROUND OF THE INVENTION

This invention relates generally to a gas turbine and, more particularly, to a gas turbine that incorporates essential features of a pressurized fluidized bed combustor cycle.

Gas turbine systems have been developed for generating electrical power which can use coal as a primary fuel source. In particular, systems have been developed in which the combustion of coal is carried out in a pressurized fluidized bed combustor (PFBC). Thus, referring to FIG. 1, there is schematically shown therein components of an exemplary advanced PFBC cycle. As will be appreciated, various components; sub-systems; and air, water/steam, and solids flowlines are omitted from the illustrated system for clarity and ease of explanation. In the illustrated system, ambient air 10 enters the compressor section 12 of the gas turbine 14 and is compressed. Compressor discharge air (80–100% of the total) is withdrawn as at 16 from the turbine 14. A major portion 18 of the compressed air extracted from the compressor 12 is directed to a PFBC 20 and a lesser portion 22 is used in, e.g., a fluid bed heat exchanger 24. The PFBC 20 is a combustion chamber in which a solid fuel is maintained in a fluidized bed to promote combustion. The solid fuel, may be a char 26 produced by a carbonizer 28, as discussed in further detail below. Thus, the compressed air extracted from the compressor and directed to the PFBC 20 fluidizes the bed and at the same time supplies the oxygen necessary for the solid fuel therein to be combusted. As a result of the combustion of the solid fuel, a hot compressed gas 30 is produced by the PFBC 20. The hot gas 30, vitiated by the combustion products, flows through a cyclone separator 32 to remove the particulate matter entrained in the gas, through a flue gas cooler 34, and a ceramic filter 36. Thereafter the hot gas 30, at about 1300° F. to 1700° F., is directed to the combustion section 40 of the gas turbine 14.

Another portion 42 of the air 16 extracted from the compressor discharge is boosted in pressure with a boost compressor 44 and used within the carbonizer 28. The carbonizer 28 is supplied with coal, which it converts to a carbonaceous char 26 and a hydrocarbon-based gas 46. The carbonaceous char 26, as mentioned above, is burned in the PFBC 20. The low BTU fuel gas (syngas) 46, which is generated from the coal or other carbonaceous fuel under reducing conditions, flows through a cyclone separator 48, fuel gas cooler 50, and ceramic filter 52 before the thus filtered fuel gas 54 is directed to the combustion section 40 of the gas turbine 14. The syngas 54 (at about 1200° F. to 1600° F.) is burned in the combustion section 40 of the gas turbine 14 using the hot vitiated gas 38 from the PFBC 20, allowing for maximum utilization of the coal.

The high temperature gas 56 from the combustion section 40 flows through the turbine section 58 where the hot gas expands thereby producing power in the rotating shaft 60 of the gas turbine 14. The temperature of the gas 62 after expansion in the turbine section 58, although reduced, is still relatively high. Thus, to increase efficiency of the system, the expanded and partially cooled gas 62 exhausting from the turbine section 58 is directed to a heat recovery steam generator (HRSG) 64 where the gas is further cooled by the transfer of heat to feed water. The steam generated by the HRSG is expanded in a steam turbine (not shown) in a known manner thereby producing additional electrical power. The HRSG and steam turbine are operatively coupled in a known manner (not shown) to, e.g., the carbonizer, the fluid bed heat exchanger, and/or the fuel gas coolers. The cooled vitiated gas 66 exhausting from the HRSG 64 is then discharged through a stack 68, to atmosphere.

While the PFBC cycle described above provides high cycle efficiency, as noted it requires substantially full extraction of compressor discharge air to feed the carbonizer and the PFBC. This PFBC cycle also requires use of the high temperature vitiated air for combustion. Neither full extraction of compressor discharge air nor the use of high temperature vitiated air is possible with conventional combustion turbines.

SUMMARY OF THE INVENTION

The present invention is embodied in a modification of the above-described PFBC cycle that preserves the essential features of the cycle while allowing the use of existing combustion turbine technology with minimal additional development. More specifically, the present invention provides an auxiliary air compressor and a vitiated air expander device for adapting the PFBC cycle for use with existing combustion turbine technology.

Thus, the invention is embodied in a gas turbine system that comprises a combustion turbine including a compressor, a combustor, and a combustion turbine; a second source of compressed air; a pressurized fluidized bed combustor (PFBC) for receiving some compressed air from the compressor and additional required air from the second source of compressed air for burning a solid fuel to produce hot gas; and an expander turbine for receiving the hot gas and for generating power from the hot gas. In an exemplary embodiment, energy is recovered from the exhaust gas from the combustion turbine by directing the exhaust gas to a heat recovery steam generator. Energy from the vitiated air from the PFBC is also preferably further recovered by directing the expander exhaust to an HRSG. In the presently preferred embodiment, the second source of compressed air is an auxiliary compressor.

Also in the presently preferred embodiment, a carbonizer is provided for converting a carbonaceous fuel to a carbonaceous char and a fuel gas. The carbonizer is also supplied with compressed air from the compressor extraction, supplemented by the second compressed air source, and further compressed with a boost compressor. The fuel gas produced by the carbonizer flows from the carbonizer to the combustor of the gas turbine for combustion to produce hot working gas for the combustion turbine, and the carbonaceous char produced by the carbonizer is used as solid fuel for the PFBC.

The invention is further embodied in a method for generating electrical power utilizing a compressor, a fuel gas combustor, a combustion turbine, a pressurized fluidized bed combustor (PFBC), an expander turbine and a solid fuel, comprising the steps of: compressing air in the compressor and flowing the compressed air toward the fuel gas combustor; extracting a portion of the compressed air; adding compressed air from a second source of compressed air to the extracted portion to define a combined flow; fluidizing and burning the solid fuel in the PFBC using compressed air from the combined flow, thereby producing hot gas; and expanding the hot gas in the expander turbine, thereby producing power and expanded gas.

In accordance with a presently preferred embodiment of the method of the invention, the method further utilizes a carbonizer, a boost compressor and a carbonaceous fuel, and comprises the additional steps of: further compressing compressed air from the combined flow with the boost compressor and flowing the further compressed air to the carbonizer for converting the carbonaceous fuel to the solid fuel and a fuel gas; feeding the solid fuel from the carbonizer to the PFBC and conducting the fuel gas to the fuel gas combustor for combustion to produce hot working gas; feeding the hot working gas from the fuel gas combustor to the combustion turbine; and conducting exhaust gas from the combustion turbine to a heat recovery steam generator.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 2:
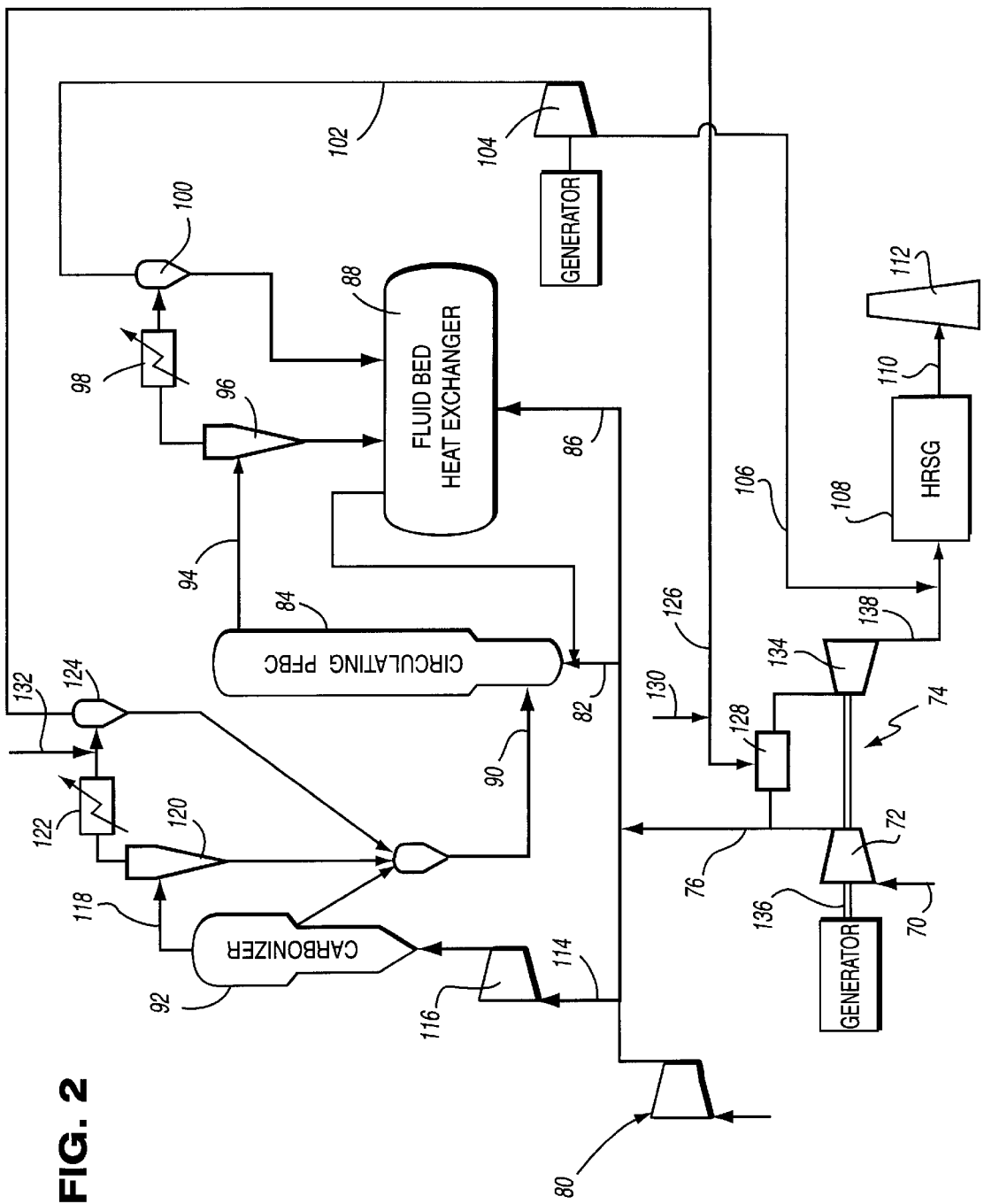
FIG. 2 is a schematic diagram of a modified advanced PFBC cycle with carbonizer and gas cooling embodying the invention.

Referring to FIG. 2 there is shown therein a modified advanced PFBC cycle that accommodates current combustion turbine technology. As in the conventional system, ambient air 70 enters the compressor section 72 of the gas turbine 74 and is compressed. Compressor discharge air is withdrawn as at 76 from the turbine 74. However, in contrast to the conventional system described above, the air extracted from the turbine 74 is limited to about 20% of the compressor discharge air. Thus, to supply the total air required by the advanced PFBC cycle, in accordance with a presently preferred embodiment, an auxiliary compressor 80 is provided.

A major portion 82 of the compressed air provided by the combined flows from auxiliary compressor 80 and the compressor discharge extraction 76 is directed to a PFBC 84 and a lesser portion 86 is used in, e.g., a fluid bed heat exchanger 88. The function of the fluid bed heat exchanger is to generate and condition steam for the steam cycle (not shown). It should be noted that the fluid bed heat exchanger is optional in the conventional and in the inventive system, and it may be an integral part of the PFBC 20 or 84.

Figure 1:
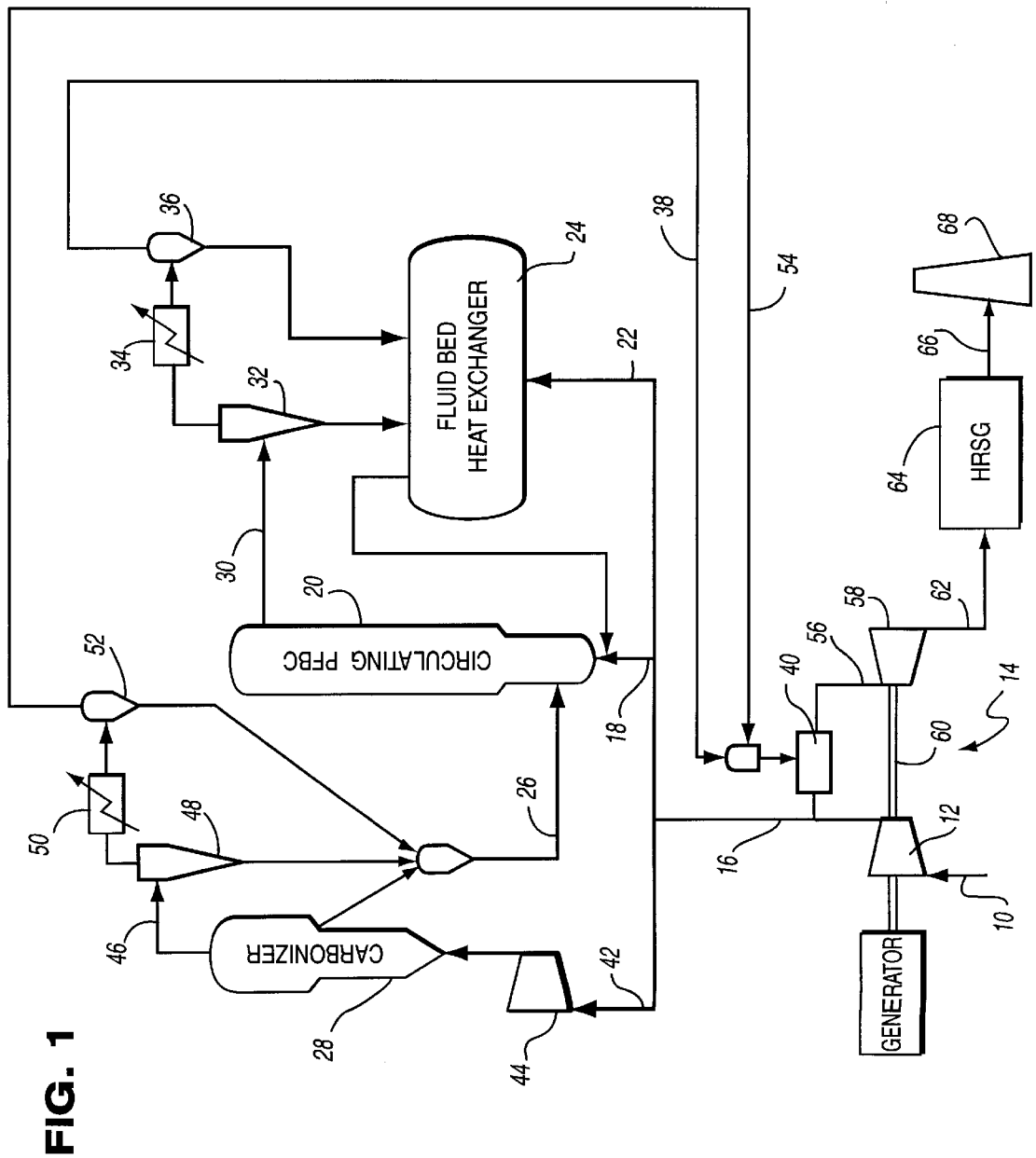
FIG. 1 is a schematic diagram of an advanced PFBC plant with carbonizer and gas cooling.

In the PFBC 84 a solid fuel which may be a char 90 produced by carbonizer 92, as discussed in further detail below, is maintained in a fluidized bed to promote combustion. Thus, the portion of the compressed air from the combination of the auxiliary compressor 80 and the compressor extraction 76 that is directed to the PFBC 84 fluidizes the bed and at the same time supplies the oxygen necessary for the solid fuel to be combusted. As a result of the combustion of the solid fuel, a hot compressed gas 94 is produced. The vitiated hot gas 94 flows through a cyclone separator 96 to remove particulate matter entrained in the gas, through a fuel gas cooler 98, and a ceramic filter 100, in a manner similar to the conventional system of FIG. 1.

To recover energy from the hot vitiated gas 102, which is at about 1300° F. to 1700° F., in accordance with a presently preferred embodiment of the invention, a separate expander turbine 104 is provided. The use of an expander turbine has several advantages. First, it can be close coupled to the source of vitiated air, minimizing the amount of expensive high temperature refractory-lined piping required for this system. Second, turbine inlet temperatures of 1700° F. are within the capabilities of certain existing combustion turbines (those which do not require internal blade cooling and for which high temperature regenerative wrappers are available). Third, it allows full use of the oxygen in the compressed air fed to the PFBC 84 because the vitiated air is not required to support combustion in the expander 104. Fourth, it avoids the problem of trying to return the vitiated air (element 38 in FIG. 1) back to the turbine (element 14 in FIG. 1) at the reduced pressure which results from pressure losses in the PFBC, cyclone, and filter. This would not be possible in an existing combustion turbine due to disruption of cooling flows and other internal pressure balances.

The energy in the vitiated air 106 is further recovered by directing the expander exhaust to an HRSG 108, which in the illustrated embodiment also receives the combustion turbine 74 exhaust (although it need not be a common HRSG), where the gas is further cooled by the transfer of heat to feed water. The steam generated by the HRSG is expanded in a steam turbine (not shown) and/or the feed water is used in a known manner for heat exchange, and the like, thereby producing additional electrical power and increasing cycle efficiency. The cooled vitiated gas 110 exhausting from the HRSG 108 is then discharged to atmosphere through a stack 112.

Another portion 114 of the combined flows from the auxiliary compressor 80 and the compressor discharge extraction 76 is used within the carbonizer 92. The pressure of the inlet air to the carbonizer must be boosted in pressure with a boost compressor 116. The function of the boost compressor 116 is to raise the pressure of the fuel generated in the carbonizer 92 so that it can be used in the combustion turbine 74. In that regard, a fuel nozzle (not shown in particular) discharges the fuel to the combustor 128, as described herein below, which is at a pressure only slightly less than the compressor discharge. The fuel pressure must be higher than the combustion chamber pressure in order to overcome the pressure drops of the fuel control valve and fuel nozzle which are necessary for control and stable operation. The boost compressor thus provides the necessary boost in pressure.

As in the conventional PFBC cycle, the carbonizer 92 is supplied with coal, which it converts to a carbonaceous char 90 and a hydrocarbon-based gas 118. The carbonaceous char 90, as mentioned above, is burned in the PFBC 84. The low BTU fuel gas (syngas) 118, which is generated from the coal or other carbonaceous fuel, flows through a cyclone separator 120, fuel gas cooler 122, and ceramic filter 124. Thereafter, the fuel gas 126 is directed to the combustion section 128 of the gas turbine 74. The syngas 126 (at about 1200° F. to 1600° F.) is burned in the combustion section 128 of the gas turbine 74. The compressor discharge air that was not extracted at 76 is used, rather than vitiated air from the PFBC, for combustion of the syngas and also provides for internal cooling as is required by the conventional combustion turbine design.

Since vitiated air is not fed to the combustion turbine, an alternative diluent, such as steam is required for NOx control. Additional diluent (beyond NOx requirements) may also be desirable for power augmentation in the combustion turbine. One option is to premix the diluent steam 130 with the syngas 126 ahead of the fuel control valve (not shown) to reduce the gas temperature to about, for example, 1000° F., thereby allowing the use of commercially available valves. In addition or in the alternative, it may be desirable to perform some or all premixing ahead of the ceramic filter 124, as shown at 132, to reduce the use of high-temperature materials and refractory-lined pipe, and to eliminate any vapor-phase alkali carry-over to the combustion turbine 74.

The high temperature gas from the combustion section 128 flows through the turbine 134 section where the hot gas expands thereby producing power in the rotating shaft 136 of the gas turbine. Thereafter, to increase efficiency of the system, the expanded and partially cooled gas 138 exhausting from the turbine section is directed to the heat recovery steam generator (HRSG) 108 where the gas is further cooled by the transfer of heat to feed water. As noted above, the steam generated by the HRSG 108 is expanded in a steam turbine (not shown) in a known manner thereby producing additional electrical power and the cooled gas 110 is then discharged through stack 112.

Additional optional modifications to the system described hereinabove may be adopted, individually or in combination, based upon the economic benefits for a given application. Such further modifications include but are not limited to the following:

The expander turbine 104 can be mechanically coupled to drive the auxiliary air compressor 80 and/or the boost air compressor 116 to reduce costs and electrical transmission losses within the plant.

The fuel gas 126 may be additionally expanded in a fuel gas expander if the fuel is generated at higher pressure than required in the gas turbine, or used at two pressure levels (e.g., a reheat combustion turbine or as a supplemental fuel in the fuel burner of the waste heat boiler).

Furthermore, the expander turbine and the auxiliary compressed air required by the cycle may be provided by a combustion turbine operated without internal combustion. For example, GE Frame 3 and 5 turbines were capable of about 90% air extraction, and a 7E could provide about 60%.

As yet a further modification, it may be preferable in some instances to have the extraction air 76 feed only the carbonizer 92 through the boost compressor 116. The auxiliary compressor would then provide air to only the PFBC and the fluid bed heat exchanger. The advantage of this configuration is that operation of the PFBC is decoupled from the gas turbine/carbonizer, allowing for simpler operation and control. It also allows an auxiliary compressor 80 that operates at a different pressure than the gas turbine compressor 72 to be used. This would be particularly advantageous when the auxiliary compressor mechanically coupled to the expander turbine and/or the expander turbine provides both functions (expander and auxiliary compressor) as discussed herein above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine system comprising:
   a gas turbine including a first compressor for compressing air, defining a first source of compressed air, a combustor in flow communication with said compressor for receiving a first portion of the air compressed by said first compressor, and a combustion turbine for expanding a hot working gas flowing thereto from said combustor;
   a second source of compressed air;
   an extraction air flow path for a second portion of said air compressed by said first compressor;
   an auxiliary air flow path for compressed air from said second source of compressed air;
   a pressurized fluidized bed combustor (PFBC) operatively coupled to at least one of said extraction air flow path and said auxiliary air flow path, for receiving compressed air therefrom for burning a solid fuel to produce hot gas;
   an expander turbine; and
   a hot gas flow path for conducting said hot gas from said PFBC to said expander turbine for generating power from said hot gas.

2. A gas turbine system as in claim 1, further comprising an exhaust gas flow path for conducting exhaust gas from said combustion turbine to a heat recovery steam generator.

3. A gas turbine system as in claim 2, further comprising an expanded gas flow path for conducting hot gas from said expander turbine to said heat recovery steam generator whereby said heat recovery steam generator generates steam from heat recovered from said hot gas produced by said PFBC and from exhaust gas from said combustion turbine.

4. A gas turbine system as in claim 1, further comprising an expanded gas flow path for conducting hot gas from said expander turbine to a heat recovery steam generator.

5. A gas turbine system as in claim 1, wherein said second source of compressed air comprises an auxiliary compressor for compressing inlet air to produce compressed air.

6. A gas turbine system as in claim 5, wherein said expander turbine is mechanically coupled to drive said auxiliary air compressor.

7. A gas turbine system as in claim 1, further comprising a carbonizer for converting a carbonaceous fuel to a carbonaceous char and a fuel gas, said carbonizer being operatively coupled to at least one of said extraction air flow path and said auxiliary air flow path, a boost compressor being disposed intermediate said carbonizer and said at least one air flow path, for further compressing compressed air received therefrom for delivery to said carbonizer; and a fuel gas flow path for conducting said fuel gas from said carbonizer to said combustor of said gas turbine for combustion to produce said hot working gas.

8. A gas turbine system as in claim 7, further comprising a char flow path for carbonaceous char produced by said carbonizer to said PFBC, thereby to define a fuel supply to said PFBC.

9. A gas turbine system as in claim 7, further comprising a steam inlet for inputting steam to said fuel gas along said fuel gas flow path.

10. A gas turbine system as in claim 9, wherein said inlet for steam is disposed proximate said carbonizer.

11. A gas turbine system as in claim 9, wherein said steam inlet is disposed proximate said combustor.

12. A gas turbine system as in claim 1, wherein said second portion of said air compressed by said first compressor is less than or equal to about 20% of said air compressed by said first compressor.

13. A gas turbine system comprising:
   a gas turbine including a compressor for compressing air, a combustor in flow communication with said compressor for receiving a first portion of the air compressed by said first compressor, a turbine for expanding a hot working gas flowing thereto from said combustor, and a flow path for conducting exhaust gas from said turbine to a heat recovery steam generator;
   a second source of compressed air;
   an extraction air flow path for a second portion of said air compressed by said first compressor;

an auxiliary air flow path for compressed air from said second source of compressed air;

a pressurized fluidized bed combustor (PFBC) operatively coupled to at least one of said extraction air flow path and said auxiliary air flow path, for receiving compressed air therefrom for burning a solid fuel to produce hot gas;

an expander turbine;

a hot gas flow path for conducting said hot gas from said PFBC to said expander turbine for generating power from said hot gas;

a carbonizer for converting a carbonaceous fuel to a carbonaceous char and a fuel gas, said carbonizer being operatively coupled to at least one of said extraction air flow path and said auxiliary air flow path, a boost compressor being disposed intermediate said carbonizer and said combined compressed air flow path for further compressing compressed air received from said at least one air flow path for delivery to said carbonizer;

a flow path for supplying said carbonaceous char produced by said carbonizer to said PFBC thereby to define a fuel supply to said PFBC; and a fuel gas flow path for conducting said fuel gas from said carbonizer to said combustor of said gas turbine for combustion to produce said hot working gas.

14. A gas turbine system as in claim 13, further comprising an expanded gas flow path for conducting hot gas from said expander turbine to said heat recovery steam generator.

15. A gas turbine system as in claim 13, further comprising a steam inlet for inputting steam to said fuel gas along said fuel gas flow path.

16. A gas turbine system as in claim 13, wherein said second source of compressed air comprises an auxiliary compressor for compressing inlet air to produce compressed air.

17. A gas turbine system as in claim 13, wherein said expander turbine is mechanically coupled to drive at least one of an auxiliary air compressor comprising said second source of compressed air and said boost compressor.

18. A gas turbine system as in claim 13, wherein said expander turbine and said second source of compressed air comprise a combustion turbine operated without internal combustion.

19. A gas turbine system as in claim 13, wherein an expander turbine is disposed along said fuel gas flow path for generating power from said fuel gas.

20. A method for generating electrical power utilizing a compressor, a fuel gas combustor, a combustion turbine, a pressurized fluidized bed combustor (PFBC), an expander turbine and a solid fuel, comprising the steps of:

compressing air in said compressor and flowing said compressed air toward said fuel gas combustor;

extracting a portion of said compressed air;

providing a second source of compressed air;

fluidizing and burning said solid fuel in said PFBC using compressed air from at least one of said extracted portion and said second source, thereby producing hot gas; and expanding said hot gas in said expander turbine, thereby producing power and expanded gas.

21. A method as in claim 20, further utilizing a carbonizer, a boost compressor and a carbonaceous fuel, and comprising the additional steps of:

further compressing compressed air from at least one of said extracted portion and said second source with said boost compressor and flowing said further compressed air to said carbonizer for converting carbonaceous fuel therein to said solid fuel and a fuel gas;

feeding said solid fuel from said carbonizer to said PFBC and conducting said fuel gas to said fuel gas combustor for combustion to produce hot working gas;

feeding said hot working gas from said fuel gas combustor to said combustion turbine; and conducting exhaust gas from said combustion turbine to a heat recovery steam generator.

* * * * *